United States Patent [19]
Hsu

[11] Patent Number: 5,435,511
[45] Date of Patent: Jul. 25, 1995

[54] MODULAR FASTENER ASSEMBLY FOR FASTENING AN AQUATIC APPLIANCE TO AN AQUATIC TANK

[76] Inventor: Hsiang-Yuan Hsu, 7-25, I-Ho Rd., San-Ho Tsuen, Ta-Ya Hsiang, Taichung Hsien, Taiwan

[21] Appl. No.: 186,643

[22] Filed: Jan. 26, 1994

[51] Int. Cl.⁶ .................................................. A45D 42/14
[52] U.S. Cl. ........................ 248/206.3; 248/221.4; 248/222.1; 248/224.1; 248/225.2; 248/311.2; 403/374; 403/398
[58] Field of Search ............... 248/206.3, 206.4, 221.3, 248/221.4, 222.1, 223.3, 223.4, 224.1, 224.2, 224.4, 225.1, 225.2, 231.8, 231.91, 311.2; 403/374, 398

[56] References Cited
U.S. PATENT DOCUMENTS

| | | | |
|---|---|---|---|
| 4,244,083 | 1/1981 | Aremka et al. ............... | 403/398 X |
| 4,874,147 | 10/1989 | Ory et al. .................... | 248/222.1 X |
| 5,035,389 | 7/1991 | Wang .......................... | 248/221.4 X |
| 5,311,688 | 5/1994 | Aeschbacher et al. ........ | 248/221.4 X |

*Primary Examiner*—Alvin C. Chin-Shue
*Assistant Examiner*—Korie H. Chan

*Attorney, Agent, or Firm*—Sughrue, Mion, Zinn, Macpeak and Seas

[57] ABSTRACT

A modular fastener assembly includes a container having a front wall, a rear wall, two opposite walls, and a bottom wall interconnecting bottom ends of the front, rear and side walls. The front, rear, side and bottom walls together define an accommodation chamber thereamong. The front wall has a hole unit formed therethrough. Each of the side walls of the container has a notch formed in the upper end thereof. A holding member is secured to the rear wall of the container and holds an aquatic appliance thereon. A fastening device is fastened to an aquatic tank. A flexible connector includes a body placed within the accommodation chamber, and two push arms secured to the body in such a manner that the push arms extend from the body in opposite horizontal directions and through the notches respectively. Each of the push arms has an outer end portion extending from the corresponding side wall of the container so as to permit pushing of the push arms toward each other. A retaining mechanism can retain releasably the connector on the fastening device when the push arms are pushed toward each other, thus permitting removal of the assembly of the connector, the container and the holding member from the fastening device.

7 Claims, 7 Drawing Sheets

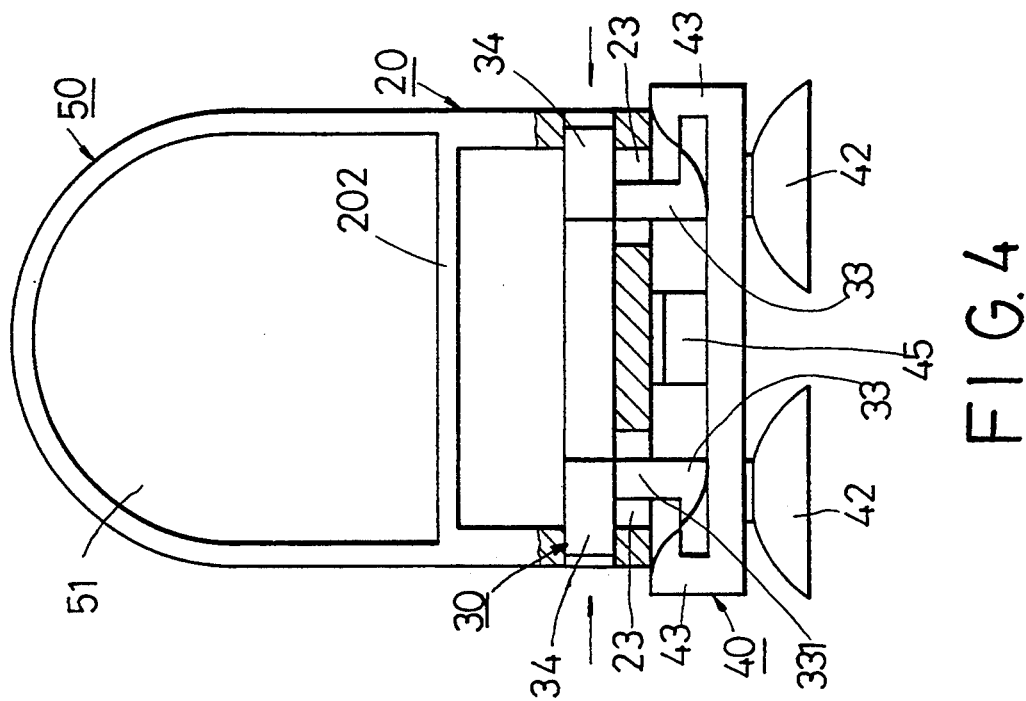
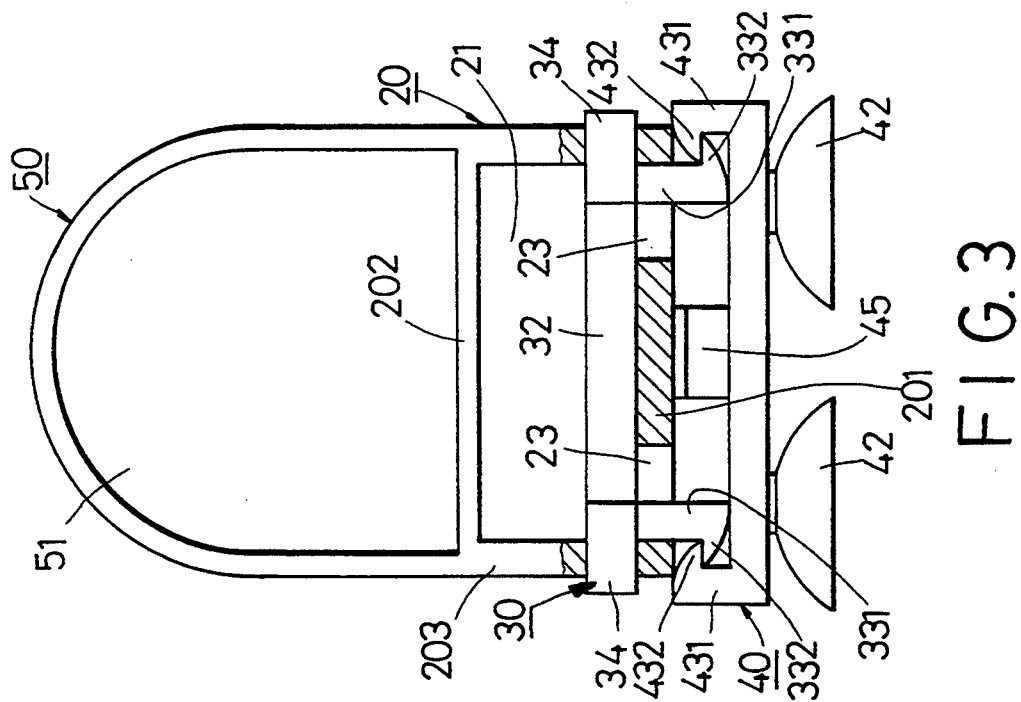

MODULAR FASTENER ASSEMBLY FOR FASTENING AN AQUATIC APPLIANCE TO AN AQUATIC TANK

BACKGROUND OF THE INVENTION

1. Field of the Invention

This invention relates to a modular fastener assembly, more particularly to a modular fastener assembly which can be easily fastened to a wall of an aquatic tank so as to hold an aquatic appliance thereon and which can be easily removed from the aquatic tank when cleaning the aquatic appliance or the aquatic tank.

2. Description of the Related Art

The improvement of this invention is directed to a conventional aquatic appliance 10, as shown in FIG. 1. The aquatic appliance 10 may be an aquatic motor, an aquatic filter, an aquatic heating device, etc.. All of these aquatic appliances can be used within an aquatic tank.

The aquatic appliance 10 includes a substantially cubic shell body 101, four engaging holes 102 (only one can be seen) formed in one of the vertical walls of the shell body 101, and four suction cups 11 fastened to one of walls of the aquatic tank. Each of the suction cups 11 has a horizontal tongue 111 which is connected securely to the distal end thereof and which extends through the corresponding engaging hole 102. Each of the tongues 111 has an enlarged end 112 which is larger than the engaging hole 102 so as to prevent the enlarged end 112 from passing through the engaging hole 102. Accordingly, the aquatic appliance 10 can be firmly fastened on the aquatic tank by means of the suction cups 11. However, when it is desired to remove the aquatic appliance 10 from the aquatic tank so as to clean the same, the suction cups 11 have to be pulled out forcibly from the wall of the aquatic tank. This can result in some inconvenience for the user.

SUMMARY OF THE INVENTION

The main objective of this invention is to provide a modular fastener assembly which can be easily fastened on a wall of an aquatic tank so as to hold an aquatic appliance thereon and which can be easily removed from the aquatic tank when cleaning the aquatic appliance or the aquatic tank.

According to this invention, a modular fastener assembly is used for fastening an aquatic appliance to an aquatic tank and includes a fastening device, a hold member, a fastening device, a flexible connector, and a retaining mechanism. The fastening device is mounted securely on a wall of the aquatic tank. The holding member is capable of holding the aquatic appliance thereon. The container is mounted securely on one of the fastening device and the holding member and is connected detachably to the other one of the fastening device and the holding member. The container has a front wall, a rear wall, two opposite walls interconnecting the front and rear walls, and a bottom wall interconnecting bottom ends of the front, rear and side walls. The front, rear, side and bottom walls together define an accommodation chamber thereamong. The front wall of the container has a hole unit formed therethrough. Each of the side walls of the container has a notch formed in an upper end thereof. The flexible connector includes a body placed within the accommodation chamber of the container, and two push arms connected securely to the body in such a manner that the push arms extend from the body in opposite horizontal directions and through the notches respectively. Each of the push arms has an outer end portion extending from one of the corresponding side walls of the container so that a user can push the push arms toward each other. The retaining mechanism is used for retaining releasably the connector on the fastening device when the container is mounted securely on the holding member, or for retaining releasably the holding member on the connector when the container is mounted securely on the fastening device.

The push arms are capable of being pushed toward each other so as to release the connector from the fastening device or so as to release the holding member from the connector, thus permitting the removal of the holding member from the fastening device.

BRIEF DESCRIPTION OF THE DRAWING

Other features and advantages of this invention will become apparent in the following detailed description of the preferred embodiments of this invention, with reference to the accompanying drawings, in which:

FIG. 3 is a sectional view showing the first embodiment of the modular fastener assembly of this invention;

FIG. 4 is a schematic view illustrating how to disassemble the modular fastener assembly according to the first embodiment of this invention;

DETAILED DESCRIPTION OF THE PREFERRED EMBODIMENTS

Figure 1:
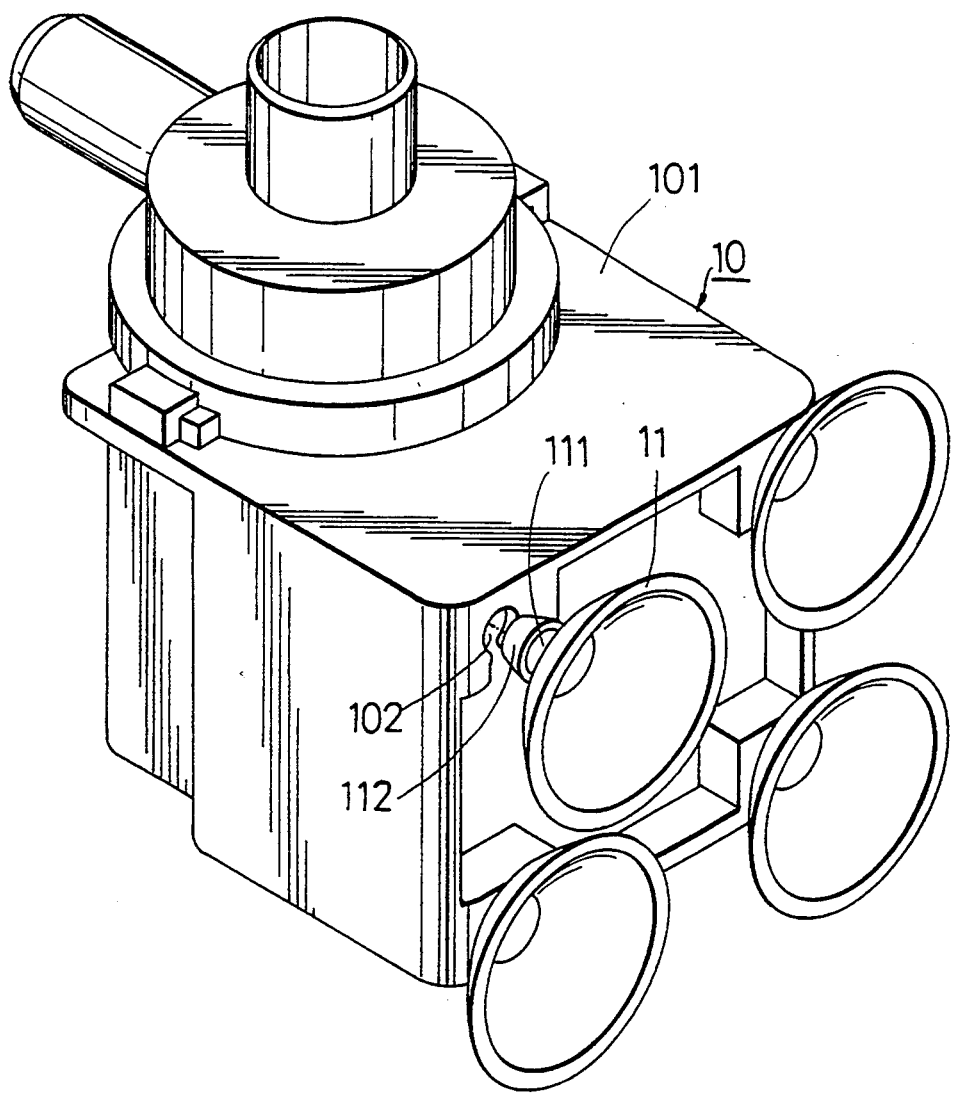
FIG. 1 is a perspective view showing a conventional aquatic appliance.
Figure 2:
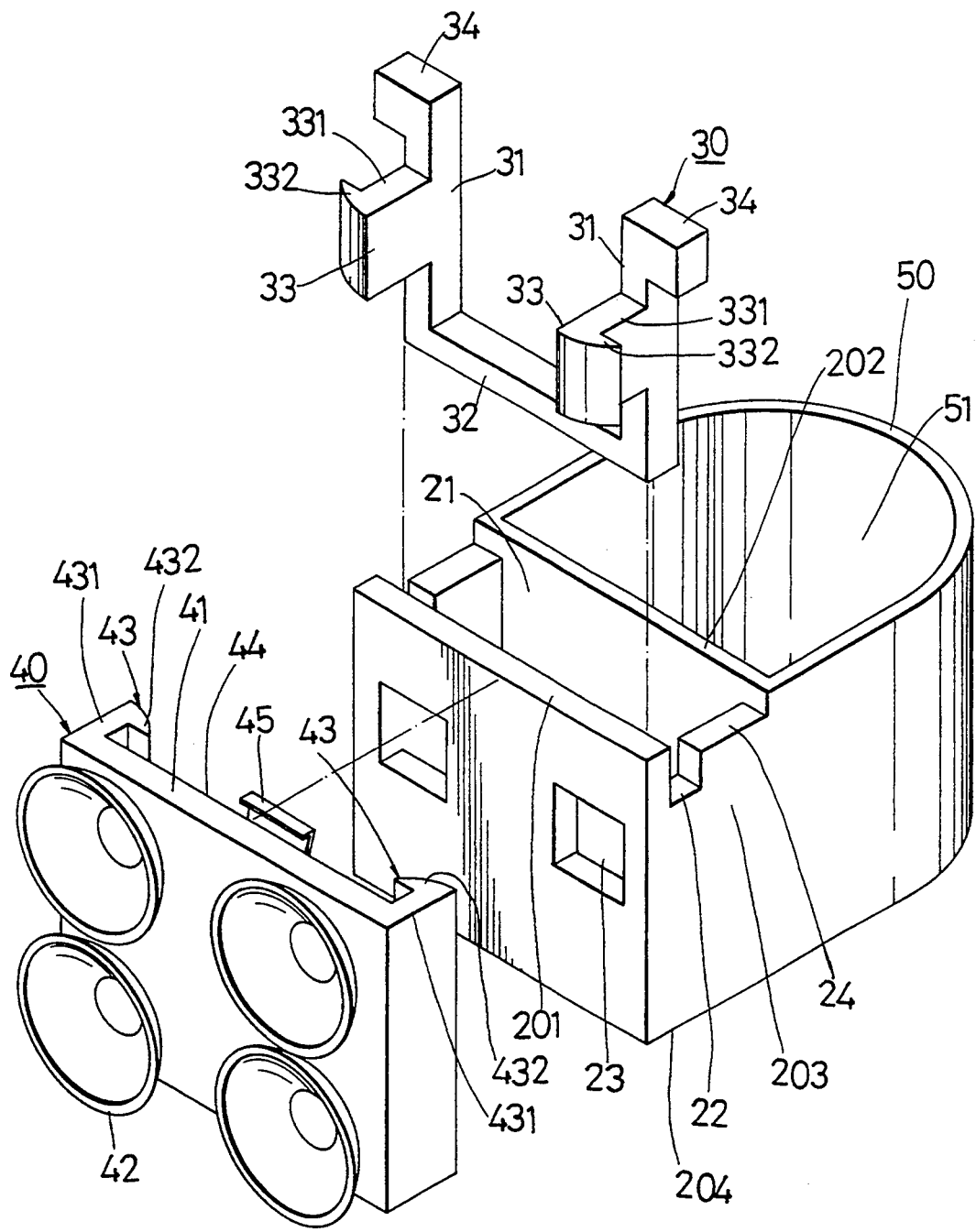
FIG. 2 is an exploded view showing a modular fastener assembly of the first embodiment of this invention which is adapted to fasten an aquatic appliance on an aquatic tank.

Referring to FIG. 2 and 3, the modular fastener assembly of the first embodiment of this invention is adapted to fasten an aquatic appliance to an aquatic tank and includes a container 20, a flexible connector 30, a fastening device 40 which is mounted securely on a wall of the aquatic tank, and a holding member 50 which can hold the aquatic appliance thereon. The aquatic appliance may be an aquatic motor, an aquatic filter, an aquatic heating device, etc..

The container 20 has a front wall 201, a rear wall 202, two opposite side walls 203 which interconnect the front wall and rear walls 201, 202, and a bottom wall 204 which interconnects the bottom ends of the front, rear, and side walls 201, 202, 203. The front, rear, side, and bottom walls 201, 202, 203, 204 together define an accommodation chamber 21 thereamong. The front wall 201 has two opposed rectangular holes 23 formed therethrough. The rectangular holes 23 together constitute a hole unit. Each of the side walls 203 has a notch 22 formed in the upper end thereof, and a horizontal shoulder 24 which is located at the upper end of the side wall 203 and which is lower than the rear wall 202 in height, as shown in FIG. 2.

The flexible connector 30 includes a generally U-shaped body which has two vertical sections 31 and a horizontal section 32 that interconnects the bottom ends of the vertical sections 31. Two push arms 34 extend respectively and outwardly from the upper ends of the vertical sections 31 of the connector 30 in opposite horizontal directions. Two hooks 33 are respectively and securely mounted on the front surfaces of the vertical sections 31. Each of the hooks 33 includes a horizontal rod 331 which is connected securely to one of the corresponding vertical sections 31, and an outwardly bent barb-like end portion 332 which has a tapered distal end. The height of the hooks 33 is less than that of the rectangular holes 23, and the width of the hooks 33 is less than that of the rectangular holes 23.

Accordingly, the connector 30 is capable of being disposed within the accommodation chamber 21 of the container 20 in such a manner that the push arms 34 of the connector 30 are placed on the shoulders 24 of the container 20. At this time, the hooks 33 are aligned with the respective rectangular hole 23. In this way, the connector 30 can be moved toward the front wall 201 of the container 20 so as to allow the hooks 33 to extend through the rectangular holes 23 until the push arms 34 are placed within the respective notch 22, thereby positioning the connector 30 on the container 20, as shown in FIG. 3. Each of the push arms 34 has an outer end portion which extends from the corresponding side wall 203 of the container 20. Accordingly, the push arms 34 of the connector 30 can be pushed toward each other, as shown in FIG. 4.

Again, referring to FIG. 2, the fastening device 40 includes a vertical plate 41 which is parallel to the front wall 201 of the container 20, four suction cups 42 which are fixed on the surface of the vertical plate 41 and which are adapted to be fastened to a wall of the aquatic tank (not shown) so as to hold the fastening device 40 on the aquatic tank, and two hook plates 43 which are connected securely to two opposite sides of the vertical plate 41. Each of the hook plates 43 has an upright plate section 431 which extends from the vertical plate 41 toward the front wall 201 of the container 20, and an inwardly bent barb-like end plate section 432 which engages the barb-like end portion 332 of one of the corresponding hooks 33 of the connector 30, as shown in FIG. 3, so as to retain releasably the connector 30 on the vertical plate 41 of the fastening device 40. The hooks 33 of the connector 30 and the hook plates 43 together constitute a retaining mechanism. Each of the barb-like end plate sections 432 has a tapered distal end. The fastening device 40 further includes a spring element 45 which is in the form of a curved spring plate (see FIG. 2) that is connected securely to and that extends from the upper end of the vertical plate 41 to press against the front wall 201 of the container 20, thereby biasing the front wall 201 of the container 20 away from the vertical plate 41 so as to provide stable engagement between the barb-like end portions 332 of the connector 30 and the barb-like end plate sections 432 of the fastening device 40.

Again, referring to FIG. 2, the distance between the hook plates 43 decreases gradually from the upper end to the lower end of the vertical plate 41 so as to define a downwardly tapered retaining space 44 between the hook plates 43, thereby permitting downward movement of the connector 30 when the barb-like end portions 332 of the hooks 33 of the connector 30 are engaged with the barb-like end plate sections 432 of the hook plates 43 of the fastening device 40.

The holding member 50 is mounted securely on the rear wall 202 of the container 20 and has an accommodation space 51 formed in the holding member 50 so as to hold the aquatic appliance (not shown) therein.

Referring to FIG. 4, because the rectangular holes 23 are wider than the hooks 33, the horizontal rods 331 of the hooks 33 of the connector 30 can move toward each other when the push arms 34 are pushed toward each other, thus permitting the connector 30 and container 20 to be forced to move vertically away from the fastening device 40.

Figure 5:
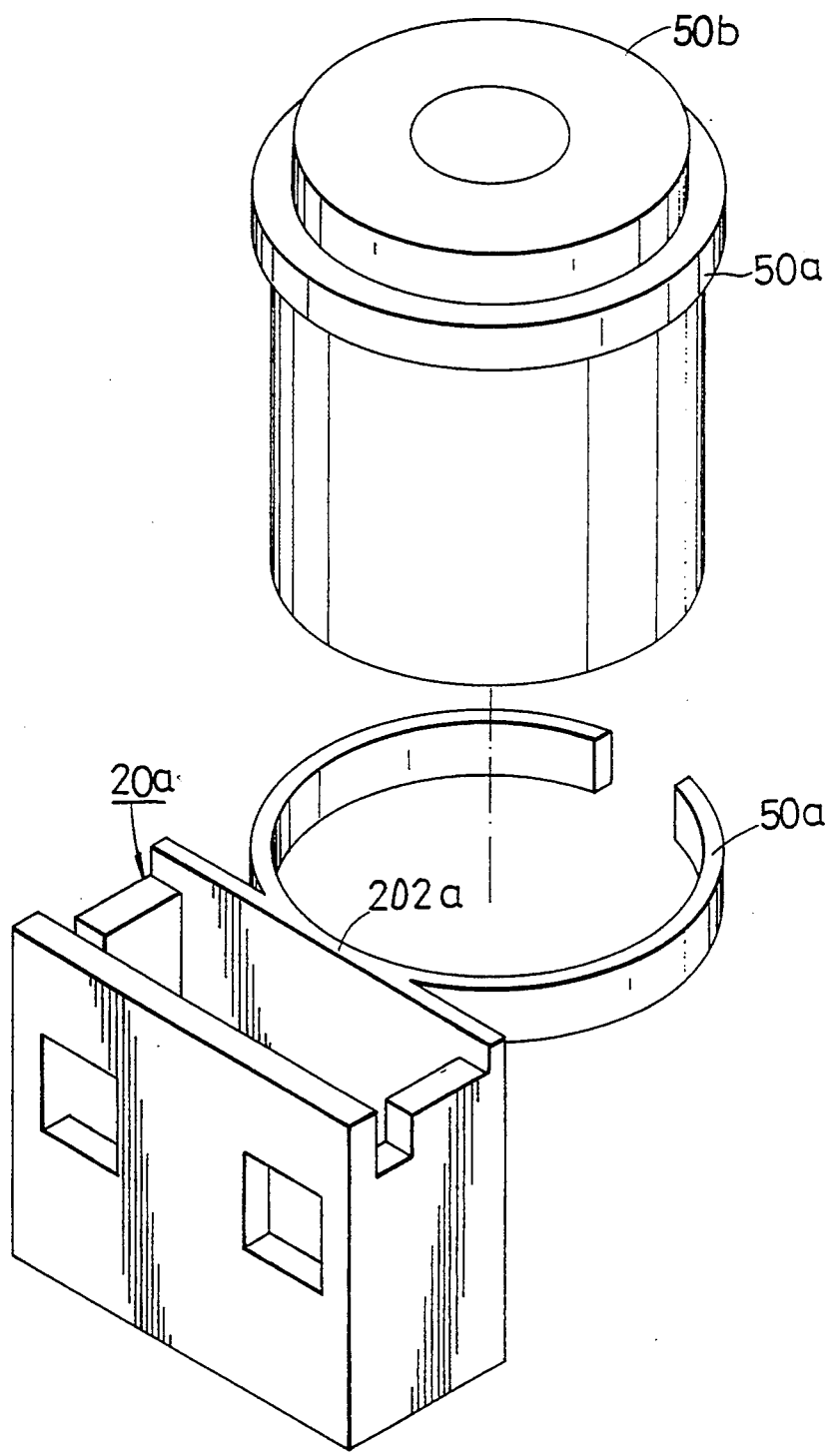
FIG. 5 is a perspective view showing a container and a holding member which is mounted securely on the container so as to hold an aquatic appliance thereon according to the second embodiment of the modular fastener assembly of this invention.

FIG. 5 shows the modified holding member of the second embodiment of the modular fastener assembly of this invention. As shown, the holding member is in the form of a substantially C-shaped retaining ring (50a) which is secured horizontally to the rear wall (202a) of the container (20a). The container (20a) is similar to that of the first embodiment in construction. The retaining ring (50a) enables a cylindrical aquatic appliance (50b) to be retained thereon.

Figure 6:
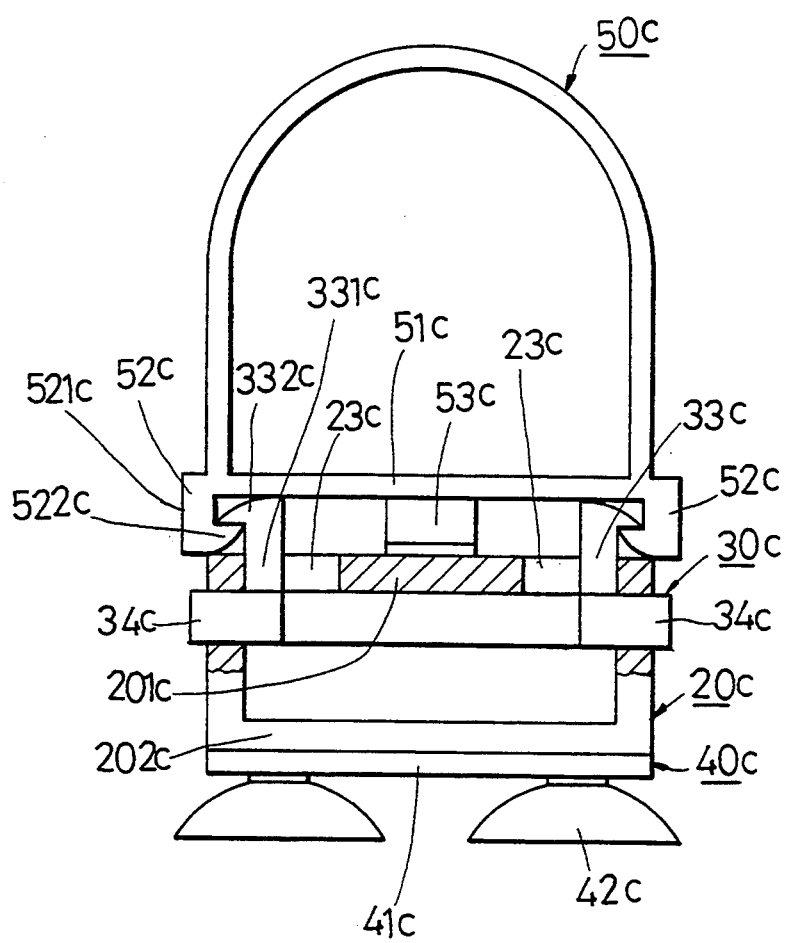
FIG. 6 is a sectional view showing a modular fastener assembly according to the third embodiment of this invention.

Referring to FIG. 6, the third embodiment of the modular fastener assembly of this invention includes a container (20c), a connector (30c), a fastening device (40c) which is mounted securely on a wall of an aquatic tank (not shown), and a holding member (50c) which can hold an aquatic appliance (not shown).

The container (20c) and the connector (30c) are similar to those of the first embodiment in construction.

The fastening device (40c) includes a vertical plate (41c) which is parallel to and which is mounted securely on the rear wall (202c) of the container (20c), and four suction cups (42c) (only two are shown) which are fixed to the vertical plate (41c) and which are adapted to be fastened to a wall of the aquatic tank so as to hold the fastening device on the aquatic tank.

The holding member (50c) includes a vertical wall (51c) which is parallel to the front wall (201c) of the container (20c), and two hook plates (52c) which are connected securely to two opposite sides of the vertical wall (51c). Each of the hook plates (52c) has an upright plate section (521c) which extends from the vertical wall (51c) toward the front wall (201c) of the container (20c), and an inward bent barb-like end plate section (522c) which engages the barb-like end portion (332c) of a corresponding one of the hooks (33c) of the connector (30c) so as to retain releasably the vertical wall (51c) of the holding member (50c) on the connector (30c).

The holding member (50c) further includes a spring element (53c) which is in the form of a curved spring plate that is similar to that of the first embodiment and which is connected securely to and which extends from the upper end of the vertical wall (51c) of the holding member (50c) so as to press against the front wall (201c) of the container (20c), thereby biasing the vertical wall (51c) of the holding member (50c) away from the front wall (201c) of the container (20c) so as to provide stable engagement between the barb-like end portions (332c)

of the connector (30c) and the barb-like end plate sections (522c) of the holding member (50c).

Because the rectangular holes (23c) are wider than the hooks (33c) (similar to the first embodiment), the horizontal rods (331c) of the hooks (33c) of the connector (30c) can move toward each other when the push arms (34c) are pushed toward each other, thus permitting the holding member (50c) to be forced to move vertically away from the container (20c) and the connector (30c).

Figure 7:
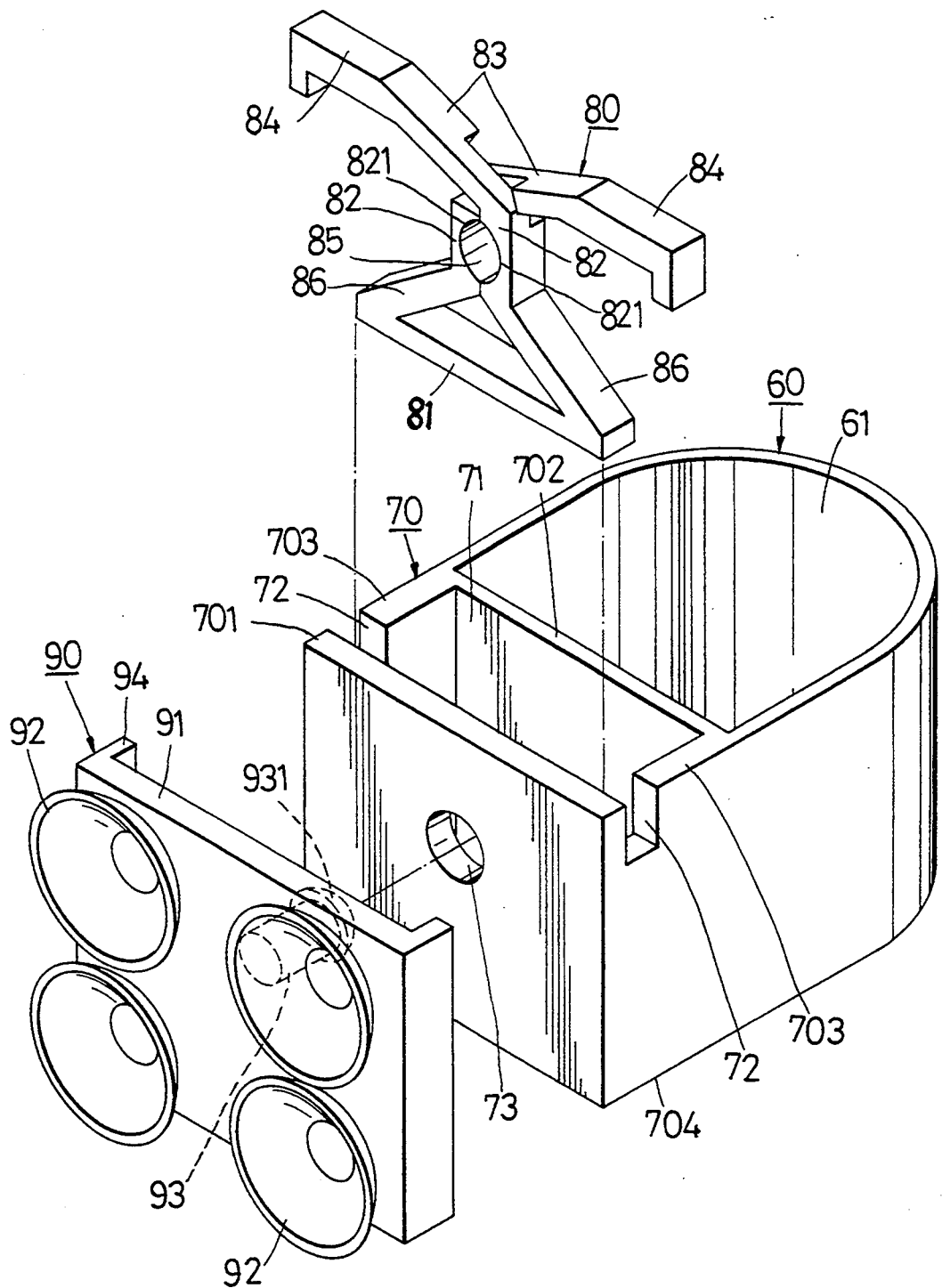
FIG. 7 is an exploded view showing a modular fastener assembly according to the fourth embodiment of this invention.
Figure 8:
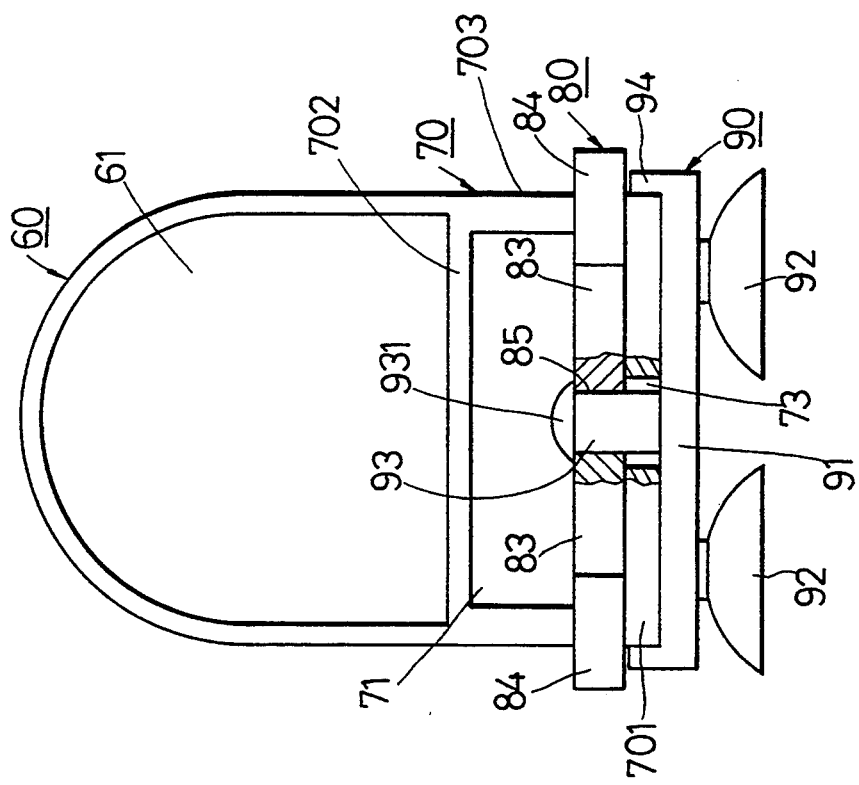
FIG. 8 is a sectional view showing the fourth embodiment of the modular fastener assembly according to this invention.

Referring to FIGS. 7 and 8, the fourth embodiment of the modular fastener assembly of this invention includes a container 70, a flexible connector 80, a fastening device 90 which is adapted to be fastened to a wall of an aquatic tank (not shown), and a holding member 60 which is similar to that of the first embodiment in construction and which can hold an aquatic appliance (not shown) thereon.

The container 70 has a front wall 701, a rear wall 702, two opposite side walls 703 interconnecting the front wall and rear walls 701, 702, and a bottom wall 704 interconnecting the bottom ends of the front, rear, and side walls 701, 702, 703. The front, rear, side, and bottom walls 701, 702, 703, 704 together define an accommodation chamber 71 thereamong. The front wall 701 has a circular hole 73 formed therethrough. The circular hole 73 constitutes a hole unit. Each of the side walls 703 has a notch 72 formed in the upper end thereof.

The holding member 60 is mounted securely on the rear wall 702 of the container 70 and has an accommodation space 61 formed therein for holding the aquatic appliance therein.

The flexible connector 80 includes a body and two push arms 84. The body of the connector 80 has a horizontal bottom rod portion 81, and two side rod portions that extend upward from two opposite ends of the bottom rod portion 81. Each of the side rod portions has a vertical middle section 82 with a curved notch 821 formed in the inward surface thereof, an inclined lower end section 86 connected securely to the bottom rod portion 81 at the lower end thereof, and an inclined upper end section 83 connected securely to one of the corresponding push arm 84. The vertical middle sections 82 of the side rod portions of the connector 80 press against each other so that the curved notches 821 together form a generally circular retaining space 85 between the vertical middle sections 82.

When the connector 80 is disposed within the accommodation chamber 71, the push arms 84 can extend through the respective notch 72 of the container 70. In this way, the retaining space 85 is aligned with the circular hole 73 of the container 70. Each of the push arms 84 has an outer end portion which extend from one of the corresponding side walls 703 of the container 70 so that the push arms 84 of the connector 80 can be pushed toward each other.

The fastening device 90 includes a vertical plate 91 which is parallel to the front wall 701 of the container 70, and four suction cups 92 which are mounted securely on the surface of the vertical plate 91 and which can be fastened to a wall of the aquatic tank so as to hold the fastening device 90 on the aquatic tank. Two upright plate sections 94 are connected securely to two opposite sides of the vertical plate 91 and extend from the vertical plate 91 toward the front wall 701 of the container 70. A horizontal tongue 93 is connected securely to the vertical plate 91 and extends through the circular hole 73 of the front wall 701 of the container 70 and through the retaining space 85 of the connector 80, as shown in FIG. 8. Accordingly, the retaining space 85 and the tongue 93 together constitute a retaining mechanism. The tongue 93 has an enlarged end 931 which is larger than the retaining space 85 of the connector 80 so that the enlarged end 931 cannot pass through the retaining space 85, thereby preventing removal of the connector 80 from the fastening device 90.

The distance between the plate sections 94 is approximately equal to the width of the front wall 701 of the container 70. Accordingly, when the tongue 93 of the fastening device 90 passes through the retaining space 85 of the connector 80, the plate sections 94 can keep the front wall 701 of the container 70 therebetween, thereby preventing wobbling of the assembly of the container 70, the connector 80 and the holding member 60 when the modular fastener assembly is in use.

Figure 9:
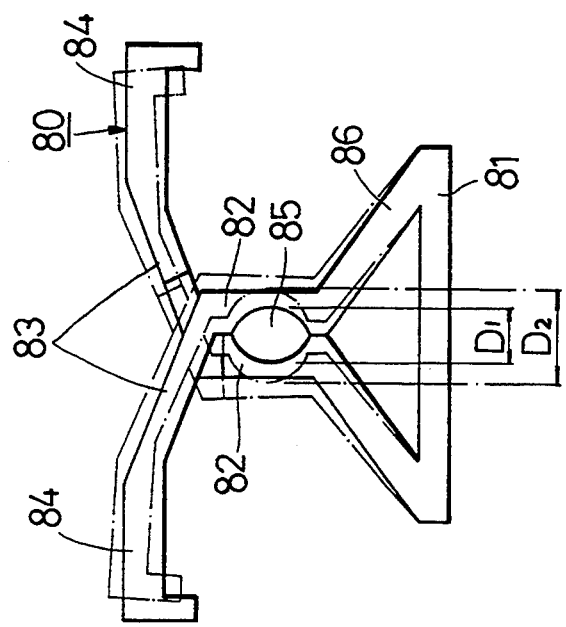
FIG. 9 is a schematic view illustrating how to operate the connector of the fourth embodiment of the modular fastener assembly in accordance with this invention.

Referring to FIG. 9, when the push arms 84 are pushed toward each other so as to separate the vertical middle sections 82 of the side rod portions of the connector 80 from each other, the size of the retaining space 85 can be extended from a width (D1) to a width (D2), the width (D2) being larger than the width (D1), thereby permitting removal of the assembly of the connector 80, the container 70 and the holding member 60 from the fastening device 90.

With this invention thus explained, it is apparent that numerous modifications and variations can be made without departing from the scope and spirit of this invention. It is therefore intended that this invention be limited only as indicated in the appended claims.

I claim:

1. A modular fastener assembly for fastening an aquatic appliance to an aquatic tank, comprising:

a fastening device adapted to be mounted securely on a wall of said tank;

a holding member adapted to hold said aquatic appliance thereon;

a container mounted securely on one of said fastening device and said holding member and connected detachably to the other one of said fastening device and said holding member, said container having a front wall, a rear wall, two opposite side walls interconnecting said front and rear walls, and a bottom wall interconnecting bottom ends of said front, rear and side walls, said front, rear, side and bottom walls together defining an accommodation chamber thereamong, said front wall of said container having a hole unit formed therethrough, each of said side walls of said container having a notch formed in an upper end thereof;

a flexible connector including a body placed within said accommodation chamber of said container, and two push arms connected securely to said body in such a manner that said push arms extend from said body in opposite horizontal directions and through said notches respectively, each of said push arms having an outer end portion extending from a corresponding one of the side walls of said container so that a user can push said push arms toward each other; and a retaining mechanism for retaining releasably said connector on said fastening device when said container is mounted securely on said holding member, or for retaining releasably said holding member on said connector when said container is mounted securely on said fastening device, said push arms being capable of being pushed toward each other so as to release said fastening device from said connector or so as to release said holding member from said connector, thus permitting removal of said holding member from said fastening device.

2. A modular fastener assembly as claimed in claim 1, wherein said holding member is mounted securely on said rear wall of said container, said hole unit including two opposed rectangular holes formed through the front wall of said container, said body of said connector being generally U-shaped and having two vertical sections and a horizontal section interconnecting bottom ends of said vertical sections, said push arms extending respectively and outwardly from upper ends of said vertical sections of said connector, said connector further including two hooks, each of which having a horizontal rod that is connected securely to a corresponding one of said vertical sections of said connector and that extends through a corresponding one of said rectangular holes of the front wall of said container, and an outwardly bent barb-like end portion which has a tapered distal end, said fastening device including a vertical plate which is parallel to the front wall of said container and which is adapted to be fastened to said tank, two hook plates connected securely to two opposite sides of said vertical plate, and a spring element connected securely to said vertical plate so as to bias said vertical plate away from said container, each of said hook plates having an upright plate section extending from said vertical plate toward the front wall of said container, and an inwardly bent barb-like end plate section engaging said bark-like end portion of a corresponding one of said hooks of said connector so as to retain releasably said connector on said vertical plate of said fastening device, each of said barb-like end plate sections having a tapered distal end, said hooks of said connector and said hook plates of said fastening device together constituting said retaining mechanism, said rectangular holes of said hole unit of said container being sized so that said horizontal rods of said hooks of said connector can move toward each other in said rectangular holes respectively when said push arms of said connector are pushed toward each other, thus permitting said connector and said container to be forced to move vertically away from said fastening device.

3. A modular fastener assembly as claimed in claim 2, wherein said spring element is in the form of a curved spring plate which is connected securely to and which extends from an upper end of said vertical plate to press against said front wall of said container.

4. A modular fastener assembly as claimed in claim 1, wherein said fastening device includes a vertical plate which is adapted to be fastened to said wall of said tank and which is parallel to and which is mounted securely to said rear wall of said container, said hole unit including two opposed rectangular holes formed through said front wall of said container, said body of said connector being generally U-shaped and having two vertical sections and a horizontal section interconnecting bottom ends of said vertical sections, said push arms extending respectively and outwardly from upper ends of said vertical sections of said connector, said retaining mechanism further including two hooks, each of which having a horizontal rod that is connected securely to a corresponding one of said vertical sections of said connector and that extends through a corresponding one of said rectangular holes of said front wall of said container, and an outwardly bent barb-like end portion which has a tapered distal end, said holding member including a vertical wall which is parallel to said front wall of said container, two hook plates connected securely to two opposite sides of said vertical wall, and a spring element connected securely to said vertical wall so as to bias said vertical wall away from said container, each of said hook plates having an upright plate section extending from said vertical wall toward the front wall of said container, and an inwardly bent barb-like end plate section engaging said bark-like end portion of a corresponding one of said hooks of said connector so as to retain releasably said vertical wall of said holding member on said connector, each of said bark-like end plate sections having a tapered distal end, said rectangular holes of said hole unit of said container being sized so that said horizontal rods of said hooks of said connector can move toward each other in said rectangular holes respectively when said push arms of said connector are pushed toward each other, thus permitting said holding member to be forced to move vertically away from said connector and said container.

5. A modular fastener assembly as claimed in claim 4, wherein said spring element is in the form of a curved spring plate which is connected securely to and which extends from an upper end of said vertical wall of said holding member to press against the front wall of said container.

6. A modular fastener assembly as claimed in claim 1, wherein said holding member is mounted securely on said rear wall of said container, said hole unit including a circular hole formed through the front wall of said container, said body of said connector having a bottom rod portion and two side rod portions extending upward from two opposite ends of said bottom rod portion, each of said side rod portions having a vertical middle section with a curved notch formed in an inward surface thereof, an inclined lower end section connected securely to said bottom rod portion at a lower end thereof, and an inclined upper end section connected securely to a corresponding one of said push arms, said vertical middle sections of said rod portions of said connector pressing against each other so that said curved notches form a generally circular retaining space between said vertical middle sections, said fastening device including a vertical plate which is parallel to the front wall of said container and which is adapted to be fastened to said tank, two upright plate sections connected securely to two opposite sides of said vertical plate, and a horizontal tongue connected securely to said vertical plate and extending through said circular hole of the front wall of said container and through said retaining space of said connector so that said retaining space of said connector and said tongue of said fastening device together constitute said retaining mechanism, said tongue having an enlarged end which is sized so that said enlarged end cannot pass through said retaining space so as to prevent removal of said fastening device from said connector, said push arms being capable of being pushed toward each other so as to separate said vertical middle sections of said side rod portions of said connector from each other, thereby allowing removal of said fastening device from said connector.

7. A modular fastener assembly as claimed in claim 1, wherein said fastening device includes a number of fixed suction cups which are adapted to be fastened to said tank.

* * * * *